United States Patent

[11] 3,589,228

| | | |
|---|---|---|
| [72] | Inventor | Jacques Bourgeois<br>Lyon, France |
| [21] | Appl. No | 846,774 |
| [22] | Filed | Aug. 1, 1969 |
| [45] | Patented | June 29, 1971 |
| [73] | Assignee | Lesieur-Cotelle<br>Boulogne sur Seine, France |
| [32] | Priority | Aug. 7, 1968 |
| [33] | | France |
| [31] | | 50,283 |

[54] DEVICE FOR THE INTRODUCTION OF BOTTLES OF PLASTICS MATERIAL INTO A TRIMMING MACHINE OR THE LIKE
9 Claims, 5 Drawing Figs.

[52] U.S. Cl...................................................... 83/373,
    83/382, 83/568, 83/914
[51] Int. Cl..................................................... B26d 7/02
[50] Field of Search............................................ 83/373,
    914, 568, 456, 382; 18/5 BS, DIG. 18; 264/161

[56] References Cited
UNITED STATES PATENTS
3,448,648   6/1969   Magruder et al. ............  83/914 X
3,461,761   8/1969   Mojonnier................ ........  83/914 X

*Primary Examiner*—James M. Meister
*Attorney*—Waters, Roditi, Schwartz and Nissen ABSTRACT: In a machine for trimming flash from blown plastics bottles, the bottle is held during trimming in a two part mold with the flash line coincident with the mold parting line. An inclined chute feeds the bottles into the lower half-mold. One side of the chute has a ledge supporting the bottle necks, so that the flash prevents the bottle from pivoting in its travel down the chute. A retractable rule is arranged in extension of the ledge so as to receive and guide the neck as the bottle leaves the chute, and falls into the lower half-mold, and ensures correct positioning therein. An axially movable rod supports and retracts the rule into a housing as the lower half-mold ascends against the upper half-mold, for the trimming operation. An auxiliary rod holds the rule in the same vertical plane as the ledge, Two retaining rods from the lower edge of the lower half-mold hold back the articles in the chute whilst the lower half-mold is in an ascended position. The chute alone or the whole of the machine may be inclined to the vertical and such inclination is adjustable.

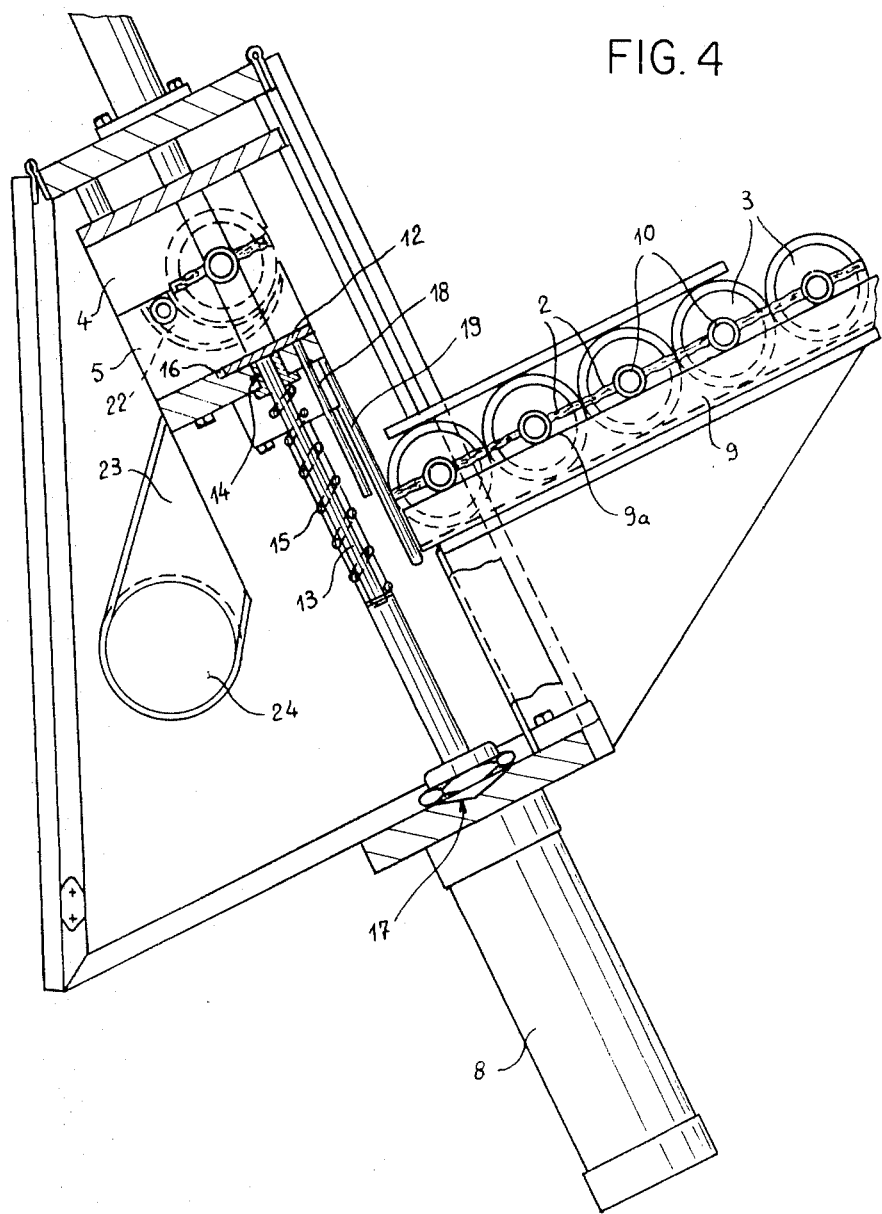

DEVICE FOR THE INTRODUCTION OF BOTTLES OF PLASTICS MATERIAL INTO A TRIMMING MACHINE OR THE LIKE

The present invention relates to a device for the introduction of bottles of plastics material into a trimming machine or the like.

In trimming machines, bottles, flasks or other articles of blown plastics material are placed in a mould of two parts, similar to the blowing mould and which, after having received the article, in open position, is closed or displaced perpendicularly to its plane of joint or mould parting line, so as to present the scraps or flashes which generally surround the neck or other part of small diameter of each bottle in this plane in line with a cutting device which ensures its removal.

In such machines, the device for introducing the articles is generally constituted by an inclined chute on which the bottles slide under the action of their own weight. One of the sides of this chute comprises a ledge intended to support the necks of the bottles, so as to prevent them from pivoting on themselves in the course of their progress in the chute. In fact, the aforesaid scraps which, resulting from blowing of the bottles, remain attached to the neck of these latter, are supported on the said ledge to oppose the rotation of the bottle.

However, at the same instant when the bottle leaves the ledge to fall into the lower half-mould intended to receive it and situated just below the lower end of the ledge, it is no longer guided and has a tendency to pivot on itself during its free fall. This pivoting is obviously not controlled and the bottle adopts any position in the mould and mostly incorrect.

Moreover, the aforesaid scraps are not constant, neither in shape nor in weight, and it happens frequently, especially in the case of particularly light bottles, that the weight of the scraps exceeds that of the bottle and unbalances it, which spoils even more the achievement of correct positioning of the bottle in the lower half-mould.

It is an object of the present invention to overcome these drawbacks. To this end, it relates to a device for the introduction of bottles or other articles of blown plastics material into a trimming machine or any other machine comprising a mould with the profile of the article to be processed, constituted by two parts having their mould parting line arranged horizontally and of which at least one is vertically movable with a view to permitting the opening and closing of the mould.

According to the invention there is provided a device, characterized in that it comprises in addition to an inclined chute, provided on one of its sides, with a ledge intended to support the necks of the bottles by preventing them from pivoting above the lower half-mould of the machine, a retractable rule arranged in extension of the ledge, of the inlet chute of the bottles, so as to receive and guide the necks of the latter to the line of the lower half-mould intended to receive them, that is to say until the bottle has left the feed chute and its bottom has fallen into the mould positioning it suitably, means being provided to cause the withdrawal of the rule on the ascent of the lower half-mould to meet the upper one.

In a preferred embodiment of the invention, in the case where the lower half-mould is movable along the vertical slides, the retractable rule is borne by a vertical rod traversing this lower half-mould through and through and on which is mounted a helical spring which, compressed between the lower end of the said rod and the lower surface of the lower half-mould, tends to hold the rule in a housing provided to receive it in the upper surface of this half-mould, an abutment being provided in the lower part of the slides and on the track of the aforesaid rod to stop its descent before the lower half-mould is at the end of its low stroke, and at the precise moment when the rule is in extension of the ledge of the chute.

In order that the invention may be more fully understood a preferred embodiment of the device according to the invention, is described below purely by way of illustrative but nonlimiting example, with reference to the accompanying schematic drawing in which:

FIGS. 2, 3, 4 show in side view and in cross section along 2-2 of FIG. 5, said embodiment, the lower mould being respectively in low, intermediate and high position.

Figure 1:
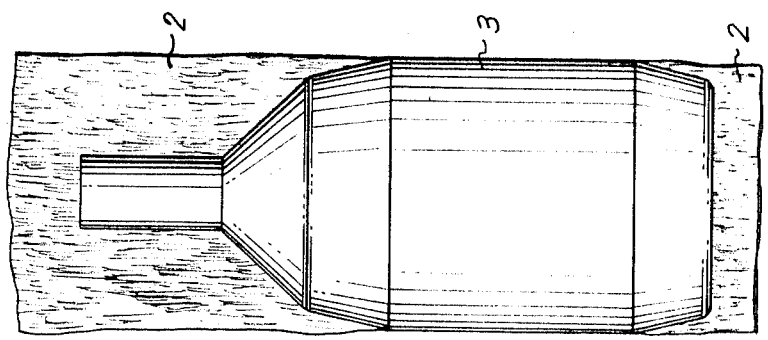
FIG. 1 shows a bottle not yet freed of its scraps.

Referring now to the drawing, FIG. 1 shows a bottle or flask 3, not yet freed from scraps 2 which, due to its formation by blowing, edge its neck and its bottom in a same diametrical plane corresponding to the plane of the parting line of the mould which serves for the blowing.

The trimming machine used to eliminate the scraps 2 from each flask 3 is principally composed of two half-molds respectively upper 4 and lower 5, whose impressions are half-profiles of the flask 3 under consideration.

the upper 4 and lower 5 half-molds slidably mounted on two columns 6 and 7 rigidly attached to the frame of the machine.

As in trimming machines of this type, the travel of the upper half-mould is limited by a lower stop not visible in the drawing and spring means hold the upper half-mould 4 normally supported against this stop.

Figure 5:
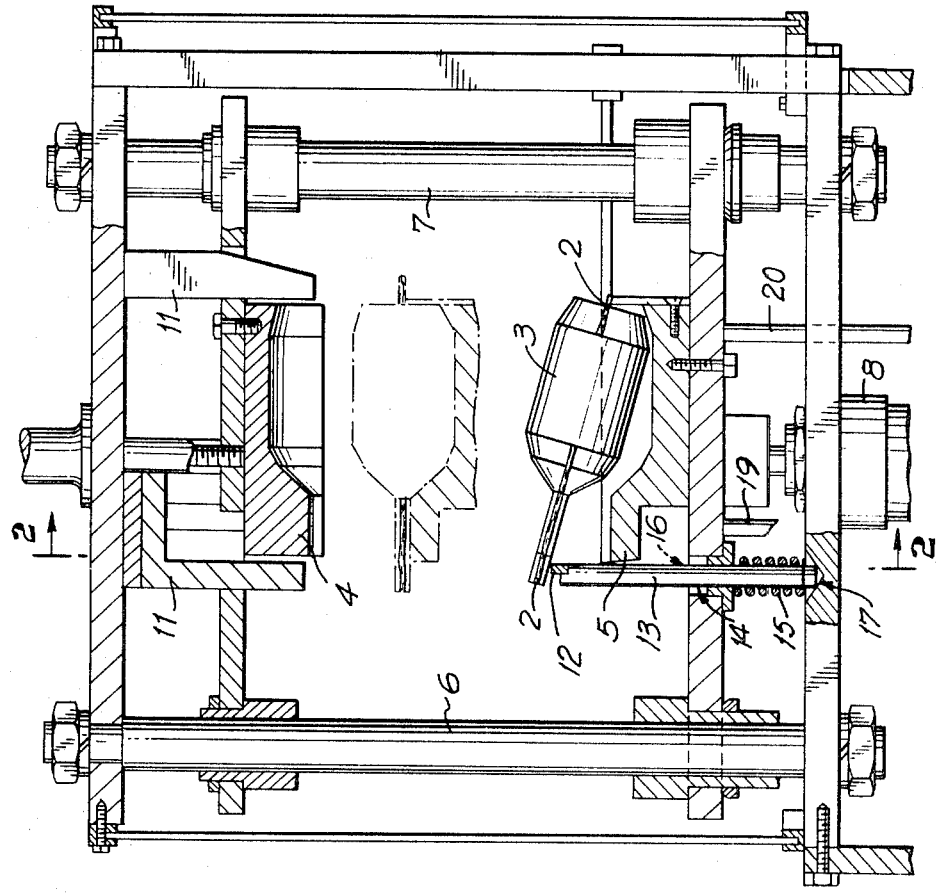
FIG. 5 is a front view in vertical cross section along 5-5 of FIG. 2.

As seen in FIG. 5, the upper half-mould 4 is surrounded by a fixed cutting device 11 borne by the frame of the machine at a level situated between the two extreme positions of the plane of the joint of the upper half-mould 4.

Figure 2:
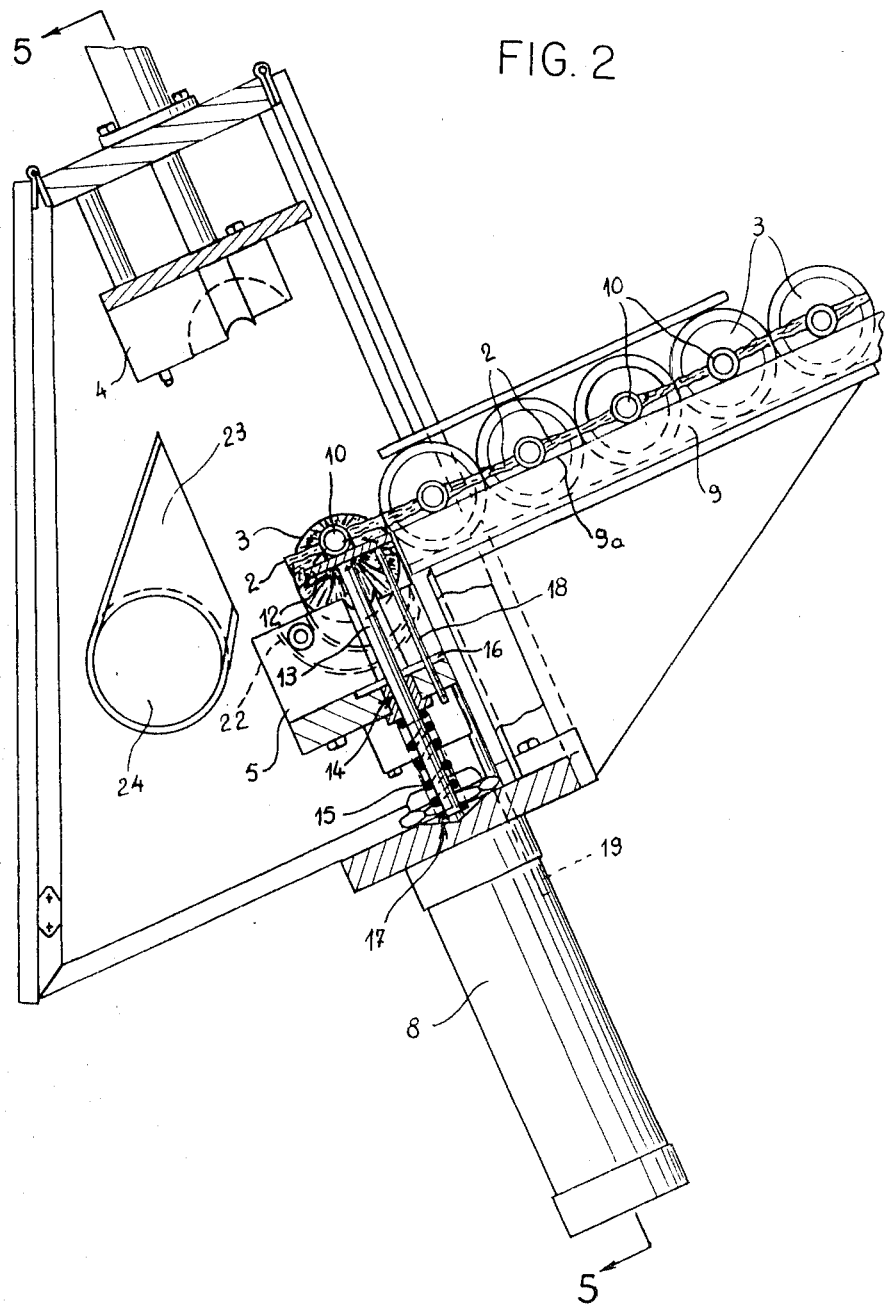

The lower half-mould 5 is connected to the rod of a hydraulic or pneumatic jack 8, enabling it to be displaced from its low position shown in FIGS. 2 and 5 to a high position shown by FIG. 4, and in which it holds the upper half-mould 5 in high position against aforesaid spring means, which hold it normally in low position.

The operation of this machine is as follows:

After the article to be trimmed has been placed in its impression when it was in low position, the lower half-mould 5 is brought by the jack 8, into high position. In the course of its ascent, the half-mould 5 arrives in contact with the half-mould 4 which corresponds to the closure of the mold 4-5, then pushes it back so that their plane of joint passes the level of the cutting device 11 which causes the trimming of the article. Then the half-mould 5 is brought back into low position and the trimmed article ejected to leave the place for a new article to be trimmed. So that this trimming may be effected in correct manner, it is indispensable that the article be correctly positioned in the lower half-mould 5. It has been said previously that the means used at present for the introduction of articles into a trimming machine do not give satisfaction and the reasons therefor are exposed.

The half-mould 5 is supplied with bottles 3 through an inclined chute 9 and of which the inclination is advantageously adjustable so as to be adaptable to the weight of the articles to be trimmed. One of the sides of the chute 9 comprises a ledge 9a which the necks 10 of the bottles 3 slide. By their support on this ledge 9a, the scraps 2 prevent the bottles 3 from pivoting around their axes, in the course of their travel in the chute 9.

To avoid the bottles from pivoting at the moment that they leave the chute 9 to fall into the half-mould 5, according to the invention, a retractable rule 12 is provided in extension of the ledge 9a, of the chute 9, when the lower half-mould 9 is in low position for reception of a bottle 3.

This rule 12 hence extends the guiding and supporting effect of the ledge 9a of the chute 9 on the necks 10 of the bottles 3, whilst their bases having left the chute 9 fall into the lower half-mould 5 as illustrated by FIGS. 2 and 5. Thus, this partial drop of the bottles 3 into the lower half-mould 5 is effected without risk of pivoting around their axis. To achieve correct angular position of the bottles 3 in the lower half-mould 5 it suffices therefore that the rule 9a be parallel with the plane of the joint of the half-molds 4 and 5.

In order not to impede the closure of the mould 4—6, this rule 12 is borne by a rod 13 sliding in a hole 14 of the same section as itself and arranged in the lower half-mould 5.

Figure 3:
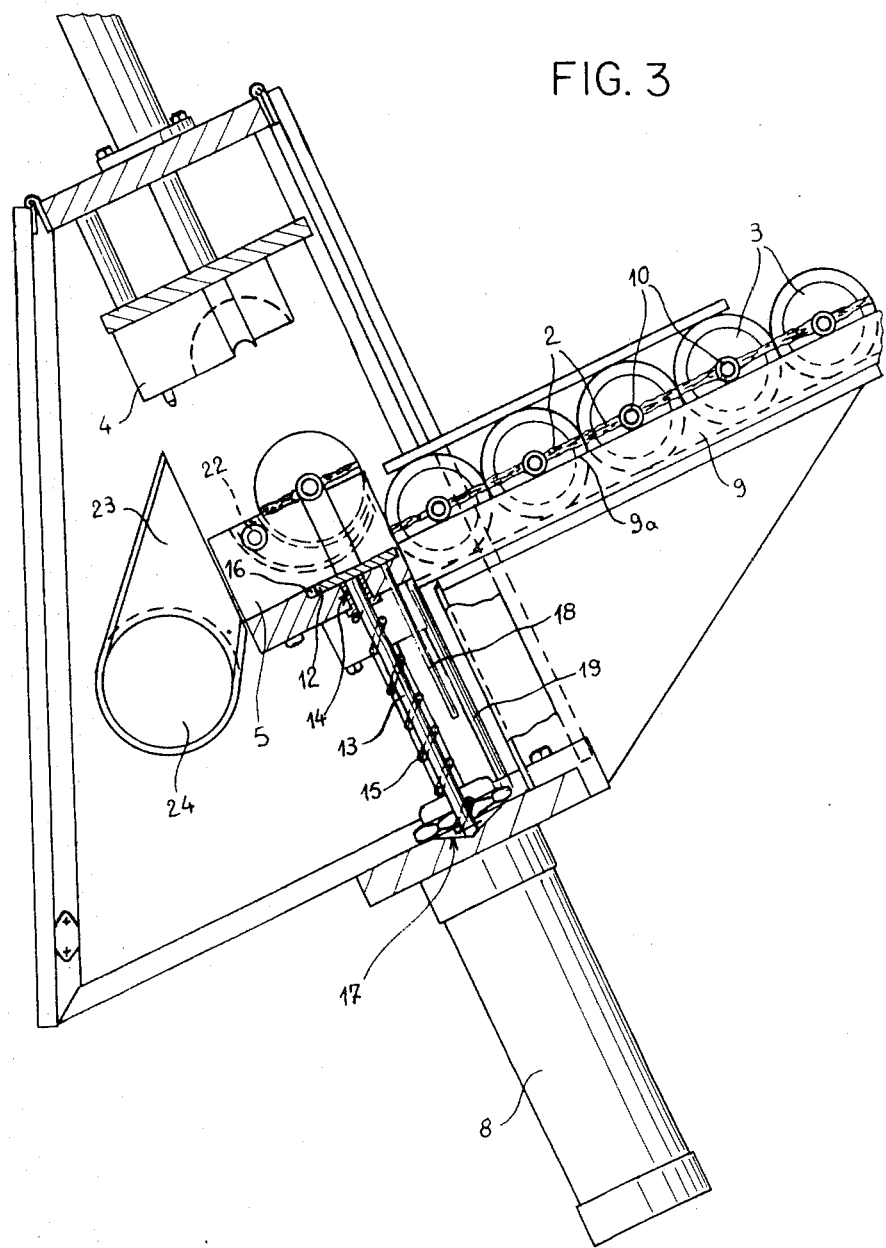

A spring 15 mounted on the rod 13 and compressed between the lower end of this latter and the lower surface of the lower half-mould 5 holds the rule 12 normally in a housing 16 provided to receive it in the upper surface of the half-mould 5. A stop 17 constituted by the lower part of the frame of the device stops the descent of the rod 13 in the course of the descent of the half-mould 5 before this latter is in low position and at the instant when the rule 12 occurs in extension of the ledge 9a of the chute 9 as illustrated in FIGS. 2 and 3. On the reascent of the half-mould 5 in the direction of the half-mould 4, the rule 12 conserves its low position under the action of the spring 15, until after being absorbed by its housing 16, it is drawn by the bottom of this latter, as illustrated by FIG. 4.

As a result, in the course of the beginning of its reascent, the half-mould 5 already supporting the bottom of the flask 3 is also engaged on the neck 10 of this latter when the rule 12 is absorbed by its housing 16.

Advantageously, the rule 12 comprises at one of its ends, an auxiliary rod 18 so as to prevent it from turning around the axis of the rod 13 and hence, to hold it in the same vertical plane as the ledge 9a of the chute 9.

At its lower part, the half-mould 5 comprises two cylindrical rods 19 and 20 intended, when the lower half-mould 5 is in high position, to retain the bottles 3 in the chute 9. Thus, it is only when the half-mould 5 is again in its initial low position, that the whole row of bottles contained in the chute 9 advances by the amount of a diameter of a bottle.

As shown in FIGS. 2, 3, and 4 the assembly of the trimming machine is preferably inclined with respect to the vertical for the purpose of enabling the bottles 3 to slide on the chute under the action of their own weight, this inclination being advantageously adjustable.

On the descent of the half-mould 5, means of known type are provided for actuating ejection claws 22 contained in the half-mould 5 and impelling the flask 3 out of the latter so that it is collected by a suction hood 23 arranged at the inlet of a channel 24 in which is created a permanent suction sufficient to lift the flask.

As is self-evident, the invention is not limited in any way to the single embodiment of this device, which has been described above, by way of nonlimiting example; it embraces, on the contrary, all variations of realization, especially, for example, that in which the trimming machine would be strictly vertical and of which only the chute would be inclined; or again that in which the ascent of the lower half-mould would be actuated by a linkage, crank or cam and crank pin or other mechanical system. All such changes and modifications are to be regarded as within the scope of the invention whose essential concept is defined by the appended claims.

I claim:
1. In a machine for processing bottle-shaped articles of plastics material, said machine having an upper and a lower half-mould for holding said articles, a device for introducing said articles, comprising in addition to a supply chute, provided on one of its sides with a ledge intended to support the necks of the articles preventing them from turning above said lower half-mould, a retractable rule arranged in extension of said ledge, so as to receive and guide the necks up to the line of said lower half-mould until the article has left said chute and its bottom has fallen into said half-mould suitably positioning it there, means being provided to cause the retraction of said rule on the ascent of the lower half-mould against the upper one.

2. A device according to claim 1, wherein the lower half-mould is movable along vertical slides, the retractable rule is borne by a vertical rod said lower half-mould traversing through and through and on which is mounted a helical spring which compressed, between the lower end of the said rod and the lower surface of the lower half-mould, tends to maintain the rule in a housing provided to receive it in the upper surface of said lower half-mould, a stop being provided in the lower part of the slide and on the track of the aforesaid rod to stop the descent thereof before the lower half-mould is at the low end of its travel, and at the precise moment when the rule is in extension of the ledge of the chute.

3. A device according to claim 1, wherein said rule comprises at one of its ends an auxiliary rod arranged to hold the rule in the same vertical plane as the ledge.

4. A device according to claim 1, wherein said lower half-mould bears from its lower edge two retaining rods arranged to hold the articles in the chute whilst the lower half-mould is in an ascended position.

5. A device according to claim 1, wherein said chute is inclined to the vertical.

6. A device according to claim 1, wherein the whole of said machine is inclined to the vertical.

7. A device according to claim 6, wherein said inclination is adjustable.

8. A device according to claim 2, wherein said rule comprises at one of its ends an auxiliary rod arranged to hold the rule in the same vertical plane as the ledge.

9. A device according to claim 3, wherein said lower half-mould bears from its lower edge two retaining rods arranged to hold the articles in the chute whilst the lower half-mould is in an ascended position.